(12) United States Patent
Scherabon et al.

(10) Patent No.: US 9,030,299 B2
(45) Date of Patent: May 12, 2015

(54) METHOD OF OPERATING A RFID SYSTEM

(75) Inventors: Christian Scherabon, Graz (AT); Bernhard Gruber, Gratwein (AT)

(73) Assignee: NXP B.V., Eindhoven (NL)

( * ) Notice: Subject to any disclaimer, the term of this patent is extended or adjusted under 35 U.S.C. 154(b) by 2264 days.

(21) Appl. No.: 11/577,315

(22) PCT Filed: Oct. 11, 2005

(86) PCT No.: PCT/IB2005/053332
§ 371 (c)(1),
(2), (4) Date: Mar. 6, 2008

(87) PCT Pub. No.: WO2006/040726
PCT Pub. Date: Apr. 20, 2006

(65) Prior Publication Data
US 2008/0258872 A1    Oct. 23, 2008

(30) Foreign Application Priority Data
Oct. 15, 2004    (EP) .................................. 04105067

(51) Int. Cl.
*H04Q 5/22*    (2006.01)
*G06K 19/07*   (2006.01)
*G06K 7/00*    (2006.01)

(52) U.S. Cl.
CPC .......... *G06K 19/0717* (2013.01); *G06K 7/0008* (2013.01); *G06K 19/0723* (2013.01)

(58) Field of Classification Search
USPC .................... 340/10.1–10.6, 572.1–572.9; 235/375–385
See application file for complete search history.

(56) References Cited

U.S. PATENT DOCUMENTS

| | | | | | |
|---|---|---|---|---|---|
| 2,220,201 | A | * | 11/1940 | Bliss | 332/153 |
| 2,647,257 | A | * | 7/1953 | Dean | 342/393 |
| 4,941,181 | A | * | 7/1990 | Igarashi et al. | 382/100 |
| 4,979,149 | A | * | 12/1990 | Popovic et al. | 365/244 |
| 5,048,085 | A | * | 9/1991 | Abraham et al. | 713/159 |
| 5,226,146 | A | * | 7/1993 | Milia et al. | 711/141 |
| 5,285,323 | A | * | 2/1994 | Hetherington et al. | 711/122 |
| 5,381,137 | A | * | 1/1995 | Ghaem et al. | 340/572.5 |
| 5,874,724 | A | * | 2/1999 | Cato | 235/492 |
| 5,874,829 | A | * | 2/1999 | Holweg et al. | 323/274 |
| 6,002,450 | A | * | 12/1999 | Darbee et al. | 348/734 |

(Continued)

FOREIGN PATENT DOCUMENTS

| | | |
|---|---|---|
| CN | 1119378 A | 3/1996 |
| EP | 0 642 096 A2 | 3/1995 |

(Continued)

*Primary Examiner* — Paul Obiniyi

(57) ABSTRACT

The invention relates to a method of operating a RFID system comprising at least one reader (1) and a plurality of wireless data carriers (2), each of which comprise at least one data processing element with slow response (5), wherein the method controls the at least one reader (1) to continuously communicate with one of the plurality of wireless data carriers (2), while at least another one of the plurality of wireless data carriers (2) is processing data with its at least one slow response element (5). The invention further relates to a RFID system comprising at least one reader (1) and a plurality of wireless data carriers (2), each of which comprises at least one slow response element (5), wherein the system is capable to continuously communicate with at least one of the plurality of wireless data carriers (2), while at least another one of the plurality of wireless data carriers (2) is processing data with its at least one slow response element (5).

21 Claims, 2 Drawing Sheets

(56) References Cited

U.S. PATENT DOCUMENTS

| | | | |
|---|---|---|---|
| 6,377,203 B1 | 4/2002 | Doany | |
| 6,456,645 B1* | 9/2002 | Kurrat | 375/140 |
| 6,806,808 B1* | 10/2004 | Watters et al. | 340/10.41 |
| 6,903,656 B1* | 6/2005 | Lee | 340/572.1 |
| 7,248,201 B2* | 7/2007 | Buccinna et al. | 341/176 |
| 7,499,737 B2* | 3/2009 | Mizuta et al. | 455/575.3 |
| 7,826,827 B2* | 11/2010 | Hull et al. | 455/412.2 |
| 7,868,751 B2 | 1/2011 | Hoshina | |
| 2001/0053708 A1* | 12/2001 | Sugiyama et al. | 455/566 |
| 2002/0091952 A1* | 7/2002 | Lin et al. | 713/300 |
| 2002/0186440 A1* | 12/2002 | Adachi et al. | 359/181 |
| 2003/0061472 A1* | 3/2003 | Kruckemyer | 712/239 |
| 2003/0129964 A1* | 7/2003 | Kohinata et al. | 455/411 |
| 2003/0137403 A1* | 7/2003 | Carrender et al. | 340/10.4 |
| 2003/0141987 A1* | 7/2003 | Hayes | 340/825.72 |
| 2003/0189509 A1* | 10/2003 | Hayes et al. | 341/176 |
| 2004/0054900 A1 | 3/2004 | He | |
| 2004/0073693 A1* | 4/2004 | Slater et al. | 709/231 |
| 2004/0125074 A1* | 7/2004 | Lin | 345/156 |
| 2004/0246100 A1* | 12/2004 | Kranz | 340/10.1 |
| 2005/0134318 A1* | 6/2005 | Baude et al. | 326/104 |
| 2005/0160451 A1* | 7/2005 | Batra et al. | 725/37 |
| 2005/0237156 A1* | 10/2005 | Scherabon | 340/10.2 |
| 2006/0032547 A1* | 2/2006 | Rossi | 141/94 |
| 2006/0065730 A1* | 3/2006 | Quan et al. | 235/451 |
| 2006/0158324 A1* | 7/2006 | Kramer | 340/447 |
| 2006/0202881 A1* | 9/2006 | Buccinna et al. | 341/176 |
| 2006/0220806 A1* | 10/2006 | Nguyen | 340/426.36 |
| 2006/0226955 A1* | 10/2006 | Murdoch et al. | 340/10.42 |
| 2007/0015548 A1* | 1/2007 | Flick | 455/569.2 |
| 2007/0279286 A1* | 12/2007 | Coutts et al. | 343/700 MS |
| 2009/0093283 A1* | 4/2009 | Mizuta et al. | 455/575.3 |
| 2010/0093429 A1* | 4/2010 | Mattice et al. | 463/25 |
| 2011/0028190 A1* | 2/2011 | Mizuta et al. | 455/575.3 |

FOREIGN PATENT DOCUMENTS

| | | | | |
|---|---|---|---|---|
| EP | 0642096 A | | 3/1995 | |
| EP | 1347409 A | | 9/2003 | |
| GB | 2308947 A | | 7/1997 | |
| GB | 2308947 A | | 9/1997 | |
| JP | 7170229 A | | 7/1995 | |
| JP | 08-315097 A | | 11/1996 | |
| JP | 2001283171 A | * | 10/2001 | G06K 19/07 |
| JP | 2004-245593 A | | 9/2004 | |
| WO | 00/16570 | | 3/2000 | |

\* cited by examiner

METHOD OF OPERATING A RFID SYSTEM

FIELD OF THE INVENTION

The invention relates to a method of operating a RFID system comprising at least one reader and a plurality of wireless data carriers, of which wireless data carriers at least a first wireless data carrier comprises a slow response element.

The invention further relates to a computer program product for performing the method according to the first paragraph.

The invention further relates to a RFID system comprising at least one reader in a plurality of wireless data carrier of which wireless data carriers at least a first wireless data carrier comprises a slow response element.

The invention further relates to a wireless data carrier for use in the system according to the third paragraph.

The invention further relates to a reader for use in the RFID system according to the third paragraph.

BACKGROUND OF THE INVENTION

The development of RFID (radio frequency identification) systems has made great progress over recent years so that many types of RFID systems have reached readiness for big installations. A conventional RFID system in general comprises a reader and a plurality of wireless data carriers so called transponders or tags 2. Each tag comprises at least one non-volatile memory, which usually is an $E^2$-memory such as an EEPROM. The reader and the plurality of tags communicate with each other through antenna means 10 using RF-signals. The reader can read and write data from/to the memory of the tags.

Such RFID systems can be used to keep track on articles provided with such a tag during a manufacturing process or for warehousing management. However, there are many other applications for RFID systems of the above-mentioned kind in access systems like car access or control systems. In such applications, very often it is not only sufficient to read the data stored in the non-volatile memory of the tag, but also to write data into its memory.

In FIG. 1, a conventional method of operating a conventional RFID system is shown. In a first step S1 the reader 1 identifies a tag 2, which is in his reception range by sending an identification command IDENTIFY. In this case, for example, tag 1 is in the reception range of reader and, in step S2, tag 1 receives and decodes the identification command IDENTIFY of the reader and sends back the ID number ID NR1 stored in his memory. After identification of step S1 and the receipt of the ID number of tag 1 ID NR1 in step S2, the reader, in step S3, sends a write command WRITE TAG1 to tag 1 to write data into the non-volatile memory of tag 1, which as a first wireless data carrier. After the data which are included in the write command WRITE TAG1 or have been transmitted before have been written into the EEPROM of tag 1, tag 1, in step S4, sends back a write acknowledge signal for confirming that the writing into the memory was successful.

However, storing of data into a non-volatile $E^2$-memory such as an EEPROM takes a considerable amount of a time (e.g., 10 to 20 ms or even more). The time needed for a writing operation of an EEPROM is therefore considerably longer than for a reading operation (about 10 to 100 times). Approximately the same amount of time is needed for encrypting or decrypting data or commands with an encryption/decryption element of the tag or for reading data from a sensor connected or part of the tag. Therefore, a non-volatile memory and a encryption/decryption element and a sensor for instance are slow response elements. With conventional methods of operating a RFID system, the reader waits until the tag processed data with the slow response element and responses. Therefore, the reader for instance waits until the writing operation into the EEPROM is completed by receiving a write acknowledge signal from the tag and does not perform any communication with other tags which are presently available in the reception range of the reader. Therefore, these RFID systems comprise for instance the disadvantage that tags which pass during the time of writing operation or encryption or decryption operation or reading data from a sensor of one tag can not be identified or read out and can therefore pass the reader unnoticed. A further disadvantage is that the available communication capacity is not sufficiently used due the inactivity of the reader during to a writing operation of a tag.

OBJECT AND SUMMARY OF THE INVENTION

It is therefore an object of the invention to provide a method of operating a RFID system defined in the first paragraph and a RFID system as defined in the third paragraph, in which the disadvantages defined above are avoided.

In order to achieve the object defined above, with a method of operating a RFID system according to the invention characteristic features are provided so that a method according to the invention is characterized defined below that is:

Method of operating a RFID system comprising at least one reader and a plurality of wireless data carriers, of which wireless data carriers at least a first wireless data carrier comprises a slow response element, wherein the at least one reader communicates with one or more of the plurality of wireless data carriers, while at least the first wireless data carrier is processing data with its slow response element.

In order to achieve the object defined above with a RFID system according to the invention characteristic features are provided so that a RFID system according to the invention can be characterized in the way defined below that is:

RFID system comprising at least one reader and a plurality of wireless data carriers, of which wireless data carriers at least a first wireless data carrier comprises a slow response element, wherein the at least one reader is capable to communicate with one or more of the plurality of wireless data carriers, while at least the first wireless data carrier is processing data with its slow response element.

The characteristic features according to the invention provide the advantage that a method operating a RFID system uses the available communication capacity more effectively and increases the identifying capacity of a RFID system. This characteristic features are advantageous to be implemented in a passive tag that uses the energy of the RF-field for the power needed to run the tag and also advantageous to be implemented in an active tag too, that uses battery for the power needed to run the tag.

The measures as claimed in claim 5 and 16 provide the advantage of an preferred implementation of the method and the RFID system, respectively, according to the invention which is effectively usable.

The power consumption of a tag that writes data into its non-volatile memory is quite high and a passive tag has to get by with the energy supplied by the reader using its internal buffer capacity. The measures as claimed in claim 7 and 17 provide the advantage that the energy supplied to each tag through the RF-field of the reader is not reduced since a modulation is used which does not or only to a small degree change the amplitude of the carrier signal of the reader. This therefore provides the advantage that for the time periods the reader communicates with one or more tags and a further tag in the RF-field writes data into its non-volatile memory this passive tag will have enough power to write the data into its non-volatile memory.

The measures according to claim 8 provide the advantage that the energy supply during writing is not excessively reduced although amplitude modulation is used.

The measures as claimed in claim 9 and 19 provide the advantage that collision of simultaneously received signals from two tags at the reader is handled and does not lead to a malfunction of the RFID system.

The measures as claimed in claim 10 provide the advantage of using group commands to communicate or write data into the non-volatile memory of more than one wireless data carrier at once.

The measures as claimed in claim 11 provide the advantage that the data of the computer program can be easily transferred between a plurality of readers for a flexible programming of the readers.

The measures as claimed in claim 18 provide the advantage that easy-to-build-readers which use amplitude modulation with a modulation degree of 100% can be used within the RFID system of the invention without reducing the reception range of the system.

The measures as claimed in claim 21 and 22 provide the advantage of a wireless data carrier that can be effectively used within the RFID system according to any one of the claims 9 to 13.

The measures as claimed in claim 23 provide the advantage of a reader which can be effectively used in the RFID system according to claims 12 or 20.

The aspects defined above and further aspects of the invention are apparent from the examples of embodiment to be described hereinafter and are explained with reference to the examples of embodiment.

BRIEF DESCRIPTION OF THE DRAWINGS

The invention will be described in more detail hereinafter with reference to the examples of embodiment but to which the invention is not limited.

DESCRIPTION OF EMBODIMENTS

Figure 2:
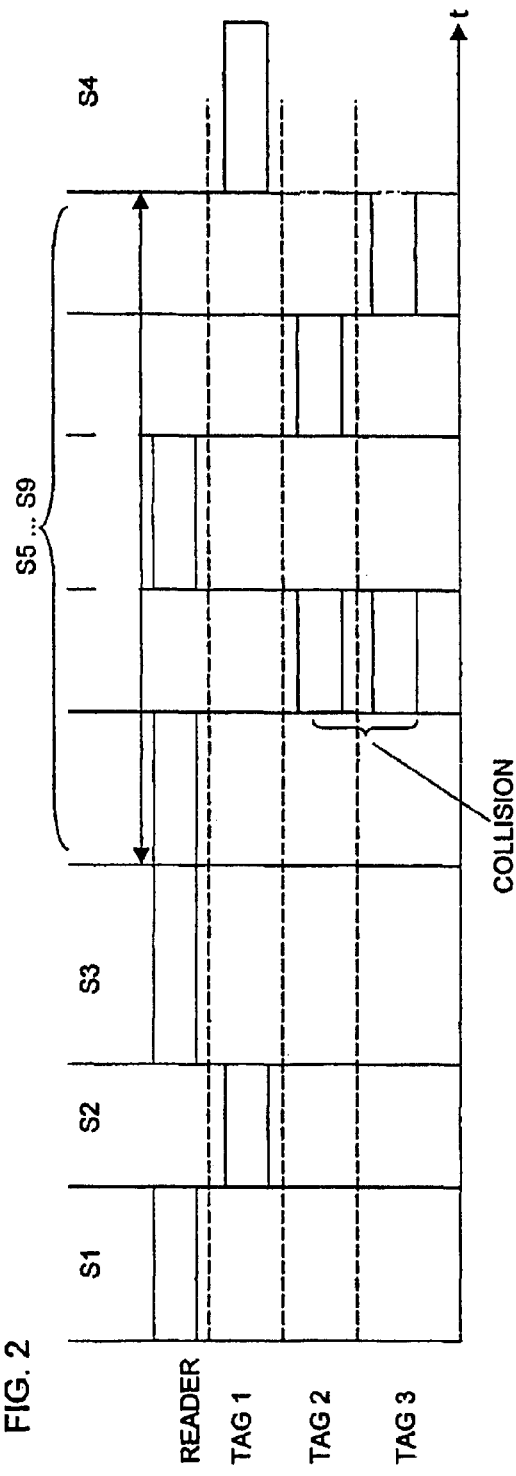
FIG. 2 shows a method of operating a RFID system according to an embodiment of the invention if form of a time chart.

FIG. 2 shows a method of operating a RFID system according to an embodiment of the invention.

In a first step S1, a reader can send an identification command IDENTIFY to determine tags which are presently in its reception range. In the scenario as shown in FIG. 2, tag 1 is in the reception range and is able to receive the identification command IDENTIFY of the reader. In step 2, tag 1 sends back its ID number ID NR1 which is stored in its non-volatile memory in response to the identification command IDENTIFY of the reader. Next, in step 3, the reader sends a write command WRITE TAG1 to tag 1 in order to write data into the non-volatile memory of tag 1. Contrary to the prior art method of operating RFID system as described with reference to FIG. 1, the reader does not deactivate its communication operation and proceeds in step S5 with sending of a further identification command IDENTIFY in order to determine further tags in its reception range. In the scenario as shown in FIG. 2, tag 2 and tag 3 respond simultaneously to the identification command IDENTIFY of the reader and create a collision situation for the reader. In a preferred embodiment of the RFID system of the invention, the reader is equipped with a unit for performing an anti-collision arbitration, which will take care of such collision situation and solve the collision in a predetermined way. In this embodiment, the reader proceeds with sending of a further identification command IDENTIFY to which the tag 2 responds before tag 3 does so that no collision situation occurs. Meanwhile, the writing operation for the data included in the writing command WRITE TAG1 in step 3 has been completed so that, in step S4, the tag 1 sends back a write acknowledge signal to the reader indicating a successful writing operation.

It has to be noted that a write acknowledge signal from the tag is not always necessary. In an embodiment of the method, the reader can wait for a predetermined time period, which is assumed to be sufficient for a writing operation of the non-volatile memory of a tag. The reader can read out the address in the EEPROM to which the data has been written according to the write command and compare the storage content with the data of the write command. If the comparison reveals no difference, the write operation is considered successful, in case the comparison reveals a difference, the writing operation is considered as unsuccessful.

Furthermore, with the method according to the invention, the identifying step S1 and the ID number response of S2 are optional, since the system can also perform writing commands without preceding identification in a broadcast manner and perform further communication during a write cycle of a tag.

In order to ensure a successful writing operation, the processing of further commands from the reader during the writing of data into the EEPROM must be suppressed within the respective wireless data carrier. In the above mentioned embodiment as shown in FIG. 2, this is achieved by implementing deactivating means in each data carrier of the RFID system which automatically inhibit any further processing after a write command of the reader has been received. However, according to a further embodiment of the invention, the method alternatively uses specific write or any other commands which contain an additional parameter indicating whether a further command processing in this wireless data carrier has to be deactivated or not. This would provide for at least two (or more, depending on the amount of digits for the parameter in the write or any other command) different write modes, i.e. one with deactivating of writing and one without. Hence, if a RFID system is used which has also wireless data carriers not equipped with deactivating means, the method can switch to the conventional method of operating if a tag without deactivating means should be written by controlling the reader to initiate a write command with an "no deactivating needed" parameter value. Therefore, a mixed operation method can be realized, resulting in a more flexible application of the invention.

In any case, after completion of the write operation in the respective wireless data carrier, the deactivation of the processing of commands from the reader is canceled and the respective wireless data carrier is ready for processing further commands from the reader. Hence, the temporarily deactivation of the command processing in the wireless data carrier to be written can be controlled through a parameter of the reader command or automatically by deactivating means responsive to the receipt of a write command.

In this embodiment, the method further controls the reader to continuously send a carrier signal, which can be modulated or unmodulated so that a wireless data carrier, which is currently writing in its non-volatile memory continuously, receives energy via the RIF-field of the reader.

In a further preferred embodiment of the method of the invention, the reader uses either frequency modulation or phase modulation but no amplitude modulation in order not to reduce the energy supplied through the RF-field of the reader to each wireless data carrier within the reception range of the reader. This might be necessary because the writing of data into the non-volatile memory such as an EEPROM needs a considerable amount of energy and a insufficient supply of energy by changing the amplitude of the carrier signal according to amplitude modulation may result in a unsuccessful writing operation. However, if a reduced reception range can be accepted, the supply with energy through the RF-field through the reader is secured with any kind of modulation. This means that the use of frequency modulation or phase modulation provides for no or at least not substantially reduced reception range of the reader for writing operation of wireless data carriers like tags.

In a still further embodiment, also amplitude modulation can be used with the method according to the invention without reducing the reception range for writing operations in the RFID system substantially. This can be achieved by using an appropriate modulation degree less than 100%. However, it has to be appreciated that due to the change in the amplitude of the carrier signal, the energy received at the wireless data carrier is always reduced compared to an unmodulated trigger signal provided that the distance between data carrier and reader is constant. This means, if amplitude modulation in an RFID system is used, this will result in a reduced reception range of the system if a fixed amount of receivable energy has to be received at the tag (e.g. for executing a writing operation into an EEPROM) compared to that of an unmodulated or phase or frequency modulated carrier signal.

In a further embodiment of the method according to the invention, the method performs an anti-collision arbitration. This means that the method controls the reader in a predetermined way to react if two or more signals from two different wireless data carriers are received simultaneously at the reader. In this situation, the reader can for example deny a further processing of any received signal but repeat the read request, which rendered the two or more simultaneously received data carrier responses.

A computer program product according to the invention, which might be directly loadable into the reader, comprises software code portions that perform the method steps according to the invention as explained above. The computer program product can be stored on a data carrier such as a CD-ROM, floppy disc, memory stick or the like. In this way the method can be easily implemented in a reader of a RFID system, which is capable of receiving such data carriers and performing computer program products. Furthermore, a computer program product stored on a data carrier of the abovementioned kind can also be used with a PC-system, which is connected to a reader for controlling the reader if the reader does not provide any internal logic as for example a microprocessor with a memory for the software code portions.

Figure 1:
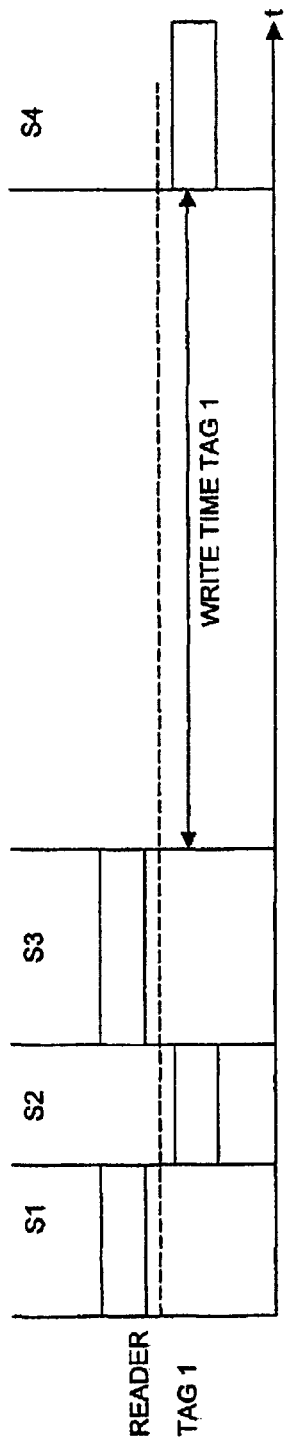
FIG. 1 shows a conventional method of operating a RFID system.

All embodiments of the method of operating a RFID system according to the invention as explained above provide for a more efficient use of the available communication capacity and hence for a better identifying capacity compared to a conventional method of operating as explained with reference to FIG. 1.

Next a RFID system is explained which is capable of performing the method according to the invention.

Figure 3:
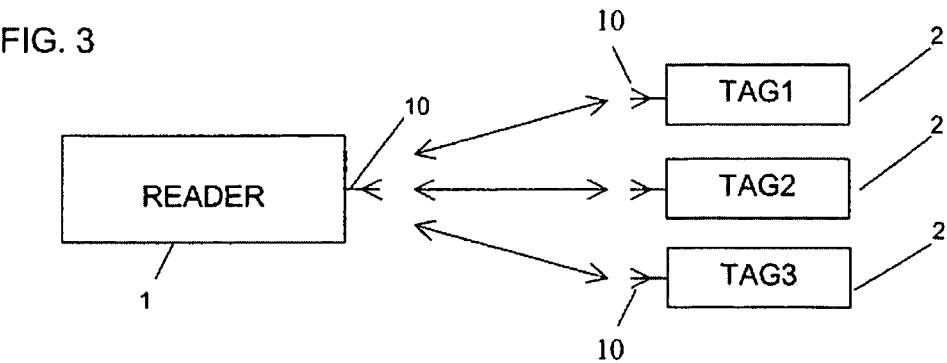
FIG. 3 shows a RFID system according to the invention in form of a block diagram.

Referring to FIG. 3, the principle construction of a RFID system is shown. The system comprises a reader 1 and a plurality of wireless data carriers 2 such as tags or transponders having one or more non-volatile memory like an $E^2$-memory such as an EEPROM. The reader 1 and the plurality of tags communicate which each other using RF-communication via an antenna 10. The RFID system of this embodiment uses inductive coupling and tags with EEPROMs typically providing a memory capacity of 16 Byte up to 8 kByte. It has to be noted that in principle also RFID systems according to the invention with more than one reader 1 can be realized. The basic construction of RFID systems with readers and tags is well known to the average expert and can therefore be omitted here.

Figure 5:
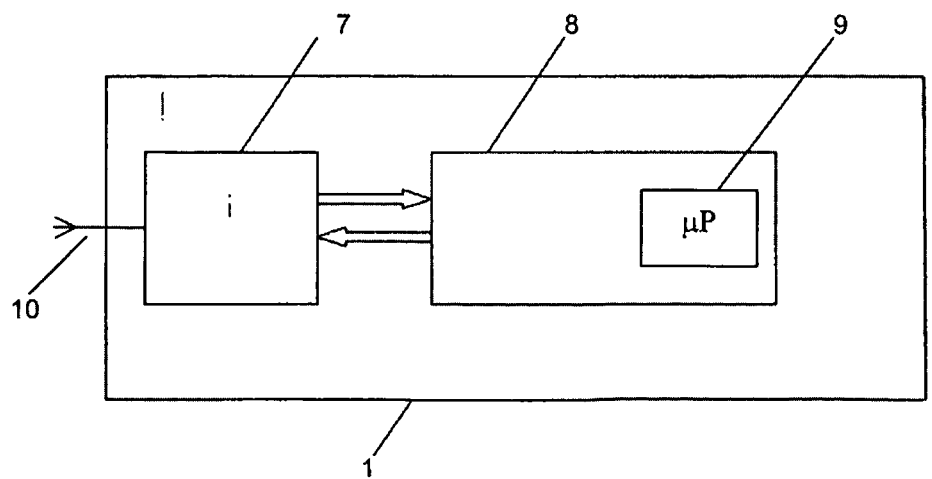
FIG. 5 shows a reader according to the invention in form of a block diagram.

The system is so configured that, while at least one of the plurality of tags 2 writes data in response to a write command of the reader into its EEPROM, the reader 1 is capable to communicate with one or more of the remaining tags 2. To this end, the reader 1 includes a control unit 8, which in turn includes a programmable logic unit 9 like a microprocessor or a hard-wired logic such as any kind of ASIC as shown in FIG. 5. Furthermore, each of the plurality of tags 2 within the RFID system is capable of deactivating the processing of commands of the reader 1 during writing in its EEPROM which can be implemented, for example, by using specific hard-wired logic as well as by using wireless data carrier which comprise a microprocessor with an appropriate program. For example, it is conceivable to modify a state machine of a tag to deactivate the processing of commands from the reader 1.

In one embodiment of the RFID system according to the invention, the reader comprises a frequency modulation unit and/or a phase modulation unit so that a modulation of the carrier signal generated in the reader 1 can be achieved that is not or only slightly reducing the amplitude of the carrier signal and therefore is not reducing the energy supplied by the RF-field of the reader to each one of the tags 2. In this way, as mentioned before, reduction of the supplied energy for a tag is avoided and a reception range for a writing operation is not reduced.

Furthermore, according to another embodiment of the RFID system according to the invention, the reader 1 comprises an amplitude modulation unit to perform an amplitude modulation of the carrier signal, preferably with a modulation degree of 100%. With this embodiment, each of the tags 2 additionally comprises a voltage regulation 6 to provide a control unit and the non-volatile memory of the tag with an appropriate DC voltage. The voltage regulation 6 has a buffer capacity, which is dimensioned such that a reception range for a sufficient energy supply during writing with a modulated carrier signal is comparable to the reception range if writing energy is supplied by an unmodulated carrier signal of the reader. That means that the buffer capacity must be increased by a certain amount to secure a sufficient voltage supply for writing if the reception range should be kept the same as compared to the use of an unmodulated carrier signal. This is due to the fact that the amplitude modulation changes the amplitude of the carrier signal and therefore reduces the amount of energy supplied by the RF-field to each wireless data carrier compared to other modulations modes, which do not change the amplitude of the carrier signal. Hence, with such an increased buffer capacity it is possible to use a reader using amplitude modulation with a modulation degree of 100%. Such a reader is very easy to realize and therefore manufacturing costs are considerably lower than those of reader, which use other modulation modes.

In an embodiment of a RFID system according to the invention, the reader 1 includes a unit for performing an anti-collision arbitration to properly handle collision situations as explained above.

Figure 4:
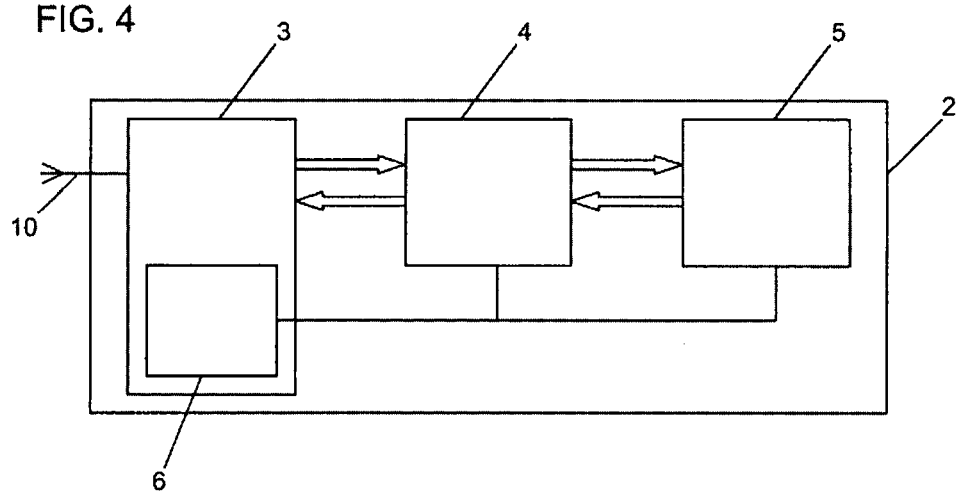
FIG. 4 shows a wireless data carrier according to the invention in form of a block diagram.

A wireless data carrier 2 is shown in FIG. 4 and comprises an analog RF-interface 3, a digital control unit 4 and a non-volatile memory 5 which in this embodiment is an EEPROM, wherein the digital control unit 4 comprises means for deactivating the processing of commands received from the reader 1 during a writing in the EEPROM. For example, a switch can be implemented which turns of a decoder included in the digital control unit 4 after the receipt of a write command from the reader 1. Also modifications to a state machine of the digital control unit 4 are conceivable.

In this embodiment, the wireless data carrier has no power supply unit so that the energy for operating the components of the wireless data carrier are achieved from the RF-field sent by the reader. However, the invention is not limited to passive wireless data carrier as the principles of the invention also apply to active wireless data carrier as long as the wireless data carrier provide for means to deactivate the processing of commands from the reader 1 during the writing of data into the non-volatile memory 5.

The reader 1 of the RFID system according to the invention comprises an analog interface 7, a control unit 8 and a logic unit 9 as can be seen in FIG. 5. The logic unit 9 can be integrated into the control unit 4. The control unit 4 comprises a hard-wired logic or a programmable logic, which secures a continued energy supply from the reader 1 to the wireless data carriers to secure sufficient energy for a successful writing operation of a respective tag 2. In case of passive tags 2, the continued energy supply may be achieved by continuously sending the carrier signal, also when a writing operation is currently performed in one data carrier 2 and the reader 1 is communicating in another tag, which is presently in the reception range of the reader 1.

According to another embodiment of a reader 1 for use in a RFID system according to the invention, the reader 1 further comprises a logic unit 9 which can run a computer program. The computer program stored on the data carrier comprises software code portions for performing the method as explained above. That means, the software code portions secure a continued supply of energy to simultaneously secure energy for a writing operation and software code portions control a wireless data carrier to deactivate a processing of commands contained in the RF-signal of the reader when performing a writing operation. In this way, the method of operating the RFID system can be easily optimized or adapted to new circumstances providing a great flexibility. The computer program can be stored on a data carrier so that it is easily to be distributed among a plurality of readers of different RFID systems. Furthermore, the data carrier can be used with a PC system, which is connected to the reader for controlling the RFID system.

It has to be stated that a wireless data carrier may comprise one or more non-volatile memories.

It has to be stated that a single write operation my comprise several commands of the reader, but can be effective for several wireless data carrier in the communication range of the reader.

It has to be appreciated that reference signs within the claims are only given for illustrative purpose and shall not be construed as limiting the scope of the method for which protection is thought after.

It has to be stated that an encryption/decryption element of a passive long range tag needs considerable time to decrypt encrypted data received from the reader or to encrypt data that shall be transmitted to the reader. Therefore, an encryption/decryption element is a slow response element too. In a further embodiment of the invention the reader transmits encrypted data to a first tag and starts communication with one or more of a plurality of tags, while the first tag decrypts the received encrypted data. The decrypted data are furthermore processed in the tag and processed data are encrypted by the tag, while the reader communicates with one or more of a plurality of tags. This has the advantage that the reader can communicate with much more tags in the same time as the communication is done in parallel.

It has to be stated that a sensor that is connected to the tag or part of the tag and that for instance measures the outside temperature needs considerable time to measure the temperature and report temperature data back to the tag. Therefore, a sensor is a slow response element too. In a further embodiment of the invention the reader transmits a request to report the actual temperature of a frozen good to a tag, which tag comprises a sensor and is attached to the frozen good. The tag receives the request and reads out the actual temperature data from the sensor, while the reader communicates with one or more of a plurality of tags. This has the advantage that the reader can communicate with much more tags in the same time as the communication is done in parallel.

The invention claimed is:

1. A method of operating a Radio Frequency Identification (RFID) system comprising at least one reader and a plurality of wireless data carriers of which at least a first wireless data carrier comprises a slow response element, wherein the method comprises:
   communicating, with the at least one reader, with one or more of the plurality of wireless data carriers;
   processing data, with the slow response element; and
   suppressing, with the at least first wireless data carrier, processing of commands from the at least one reader in the first wireless data carrier until completing the respective data processing operation in the slow response element.

2. The method of claim 1, wherein the slow response element is a non-volatile memory and further comprising:
   writing, with the first wireless data carrier, data to the non-volatile memory while the at least one reader communicates with one or more of the plurality of wireless data carriers.

3. The method of claim 1, wherein the slow response element is an encryption/decryption element and further comprising:
   either encrypting or decrypting data, with the first wireless data carrier, while the at least one reader communicates with one or more of the plurality of wireless data carriers.

4. The method of claim 1, wherein the slow response element is a sensor and further comprising:
   reading data, with the first wireless data carrier, from the sensor, while the at least one reader communicates with one or more of the plurality of wireless data carriers.

5. The method of according to claim 1, further comprising:
   supplying, with the at least one reader, at least the first wireless data carrier with energy, while the first wireless data carrier is processing data with its slow response element.

6. The method of claim 1, further comprising:
   modulating, with the at least one reader, a data signal to be transmitted to one or more of the plurality of wireless data carriers using either frequency modulation or phase modulation.

7. The method of claim 1, further comprising:
modulating, with the at least one reader, a data signal to be transmitted to one or more of the plurality wireless data carriers using amplitude modulation with a modulation degree less than 100%.

8. The method of claim 1, further comprising:
performing an anti-collision arbitration.

9. The method of claim 1, further comprising:
performing, with the at least one reader, a single write operation with either part or all of the plurality of wireless data carriers to write data into the non-volatile memory of either part or all of this plurality of wireless data carriers.

10. A non-transitory computer program product comprising software code portions for performing the method according to claim 1 when the computer program product is run on the at least one reader.

11. A Radio Frequency Identification (RFID) system comprising:
at least one reader; and
a plurality of wireless data carriers, of which a first wireless data carrier comprises a slow response element, wherein the at least one reader is capable to communicate with one or more of the plurality of wireless data carriers while the first wireless data carrier is processing data with the slow response element and the first wireless data carrier suppresses the processing of commands from the at least one reader in the first wireless data carrier until completing the respective data processing operation in the slow response element.

12. The RFID system according to claim 11, wherein the slow response element is a non-volatile memory.

13. The RFID system according to claim 11, wherein the slow response element is an encryption/decryption element.

14. The RFID system according to claim 11, wherein the slow response element is a sensor.

15. The RFID system according to claim 11, wherein the at least one reader comprises either a frequency modulation unit or a phase modulation unit to modulate a data signal to be transmitted to one or more of the plurality of wireless data carriers.

16. The RFID system according to claim 11, wherein the at least one reader comprises an amplitude modulation unit and each of the wireless data carriers comprises a voltage regulation unit having a buffer capacity which is increased compared to a buffer capacity for use with either a frequency modulation unit or phase modulation unit so that a reception range for a sufficient energy supply of a writing operation of one the plurality of wireless data carriers when the amplitude modulation unit is used is comparable to the reception range when either the frequency modulation unit or the phase modulation unit is used.

17. The RFID system according to claim 11, further comprising:
a unit for performing an anti-collision arbitration.

18. The RFID system according to claim 12, wherein the at least one reader performs a write operation with part or all of the plurality of wireless data carriers to write data into a non-volatile memory of part or all of the plurality of wireless data carrier.

19. A wireless data carrier for use in a RFID system according to claim 11, the wireless data carrier comprising:
an analog RF-interface:
a digital control unit; and
a data processing unit with a slow response element, wherein the digital control unit comprises means for suppressing the processing of commands from the at least one reader during processing of data with the slow response element.

20. A wireless data carrier according to claim 19, wherein the digital control unit further comprises:
a command decoder, which is capable to be deactivated after receipt of a write command from the at least one reader.

21. A reader for use in a RFID system according to claim 11, the reader comprising:
an analog RF-interface; and
a control unit which further comprises a logic unit which is capable to perform the computer program product according to claim 10.

\* \* \* \* \*